(12) United States Patent
Lim et al.

(10) Patent No.: US 9,886,754 B2
(45) Date of Patent: Feb. 6, 2018

(54) SYSTEM AND METHOD FOR DETECTING MISSING TOOTH IN MINING SHOVEL (71) Applicant: General Electric Company, Schenectady, NY (US)

(72) Inventors: Ser Nam Lim, Niskayuna, NY (US); Ning Zhou, Niskayuna, NY (US); Joao Vitor Baldini Soares, Sunnyvale, CA (US)

(73) Assignee: General Electric Company, Niskayuna, NY (US)

(*) Notice: Subject to any disclaimer, the term of this patent is extended or adjusted under 35 U.S.C. 154(b) by 94 days.

(21) Appl. No.: 15/090,646

(22) Filed: Apr. 5, 2016

(65) Prior Publication Data
US 2017/0287124 A1 Oct. 5, 2017

(51) Int. Cl.
G06T 7/00 (2017.01)
E02F 9/26 (2006.01)
G06T 7/40 (2017.01)

(52) U.S. Cl.
CPC .............. G06T 7/001 (2013.01); E02F 9/267 (2013.01); G06T 7/0008 (2013.01); G06T 7/408 (2013.01); G06T 2207/10024 (2013.01); G06T 2207/20076 (2013.01); G06T 2207/30164 (2013.01)

(58) Field of Classification Search
CPC ....... G06T 7/0008; G06T 7/001; G06T 7/408; G06T 2207/10024; G06T 2207/20076; G06T 2207/30164; E02F 9/267
See application file for complete search history.

(56) References Cited

U.S. PATENT DOCUMENTS 6,246,788 B1 * 6/2001 Pattikonda ......... G01N 21/9501
257/E21.525
7,406,399 B2 7/2008 Furem et al.
8,284,096 B2 10/2012 Martinez et al.
(Continued)

FOREIGN PATENT DOCUMENTS

CN 203096809 U * 7/2013
CN 104018545 A 9/2014

OTHER PUBLICATIONS

He et al. ("Object detection by parts using appearance, structural and shape features," International Conference on Mechatronics and Automation, Aug. 7-10, 2011).*
(Continued)

Primary Examiner — Yubin Hung
(74) Attorney, Agent, or Firm — Pabitra K. Chakrabarti (57) ABSTRACT A method for detecting missing tooth in mining shovel, implemented using a processing device, includes receiving a pair of image frames from a camera disposed on a rope mine shovel configured to carry a mining load. A tooth line region corresponding to the pair of image frames is detected to generate a pair of tooth line regions based on a shovel template set. A difference image is determined based on the pair of image frames and the pair of tooth line regions. Further, a response map representative of possible tooth positions is determined based on the difference image using a tooth template matching technique. A tooth line is selected among a plurality of candidate tooth lines based on the response map. Further, a tooth condition is determined based on the tooth line and the difference image. The tooth condition is notified to an operator of the rope mine shovel.

23 Claims, 5 Drawing Sheets

(56) References Cited

U.S. PATENT DOCUMENTS

| | | | |
|---|---|---|---|
| 8,411,930 B2 | 4/2013 | Ridley et al. | |
| 2005/0105770 A1* | 5/2005 | Sumitomo | G06K 9/00362 382/103 |
| 2007/0249932 A1* | 10/2007 | Shahinian | A61B 1/00087 600/421 |
| 2010/0142759 A1* | 6/2010 | Ridley | G06T 7/0008 382/107 |
| 2012/0253583 A1* | 10/2012 | Herdle | E21C 35/08 701/28 |
| 2013/0049935 A1* | 2/2013 | Miller | H04Q 9/00 340/10.1 |
| 2015/0085123 A1 | 3/2015 | Tafazoli et al. | |
| 2015/0149049 A1* | 5/2015 | Bewley | E02F 9/2816 701/50 |

OTHER PUBLICATIONS

Kouche et al. ("Monitoring operational mining equipment using Sprouts Wireless Sensor Network platform," 9th International Wireless Communications and Mobile Computing Conference, 2013).*

Lucas et al., "An iterative image registration technique with an application to stereo vision", In Proceedings of the 7th International Joint Conference on Artificial Intelligence, pp. 674-679, 1981.

"Vision system detects missing shovel teeth", Vision Systems Design, http://www.vision-systems.com/articles/print/volume-6/issue-10/technology-trends/industrial/vision-system-detects-missing-shovel-teeth.html, Oct. 1, 2001, 3 Pages.

Briechle et al., Template matching using fast normalized cross correlation. Proceedings SPIE, vol. 4387, pp. 95-102, 2001.

Luo et al., "Missing tooth detection with laser range sensing", Intelligent Control and Automation, 2004. WCICA 2004. Fifth World Congress, vol. 4, pp. 3607-3610, Jun. 15-19, 2004.

Dalal et al., "Histograms of oriented gradients for human detection", In Proceedings of IEEE Conference on Computer Vision and Pattern Recognition, vol. 1, pp. 886-893, Jun. 2005.

Fawcett, "An introduction to ROC analysis", Pattern Recognition Letters, vol. 27, Issue 8, pp. 861-874, 2006.

Tafazoli, "Industrial vision system checks for missing teeth", Matrox Imaging, http://www.matrox.com/imaging/en/press/feature/heavy_industry/excavator/, 2 Pages, Downloaded fon Dec. 19, 2015.

* cited by examiner

SYSTEM AND METHOD FOR DETECTING MISSING TOOTH IN MINING SHOVEL

BACKGROUND

Embodiments of the present specification relate generally to mining industry, and are especially directed towards a vision system for monitoring tooth condition and detecting a missing tooth in a rope mine shovel.

Mineral from a mine is processed by a crusher to obtain particles of uniform size under eight inches in diameter. Crushers are large electric equipment specialized in crushing the mineral rocks. Transport devices discharge the mineral in the top section of these crushers and the crushed mineral is collected in the bottom discharge which is sent to a concentrator to be subjected to a grinding process. An uncrushable element entering into the crusher may cause a mechanical jam that will force the crusher to be stopped, and so all the mineral discharge and crushing process must also be stopped.

When the mineral include ferromagnetic metals, an electromagnet may be used over a conveyor belt that carries the material to be processed. The magnet attracts the metallic pieces and drags them to a waste storage deposit. However, these solutions are not adequate for transport devices that transport materials to primary crushers, since in some cases mineral rocks and rock fragments are also loaded in large capacity. Additionally, many metallic pieces are made of austenitic steel and therefore cannot be removed by electromagnets.

Optical systems and video cameras are used to detect the fall of teeth of a mechanical shovel that loads a mineral transport truck. Variants of the same solution incorporate lasers to illuminate the inspection zone. These devices operate in the visible or near infrared (NIR) range and present a low degree of efficacy because of the environmental contamination by dust, which have a particle size in the range of the emission wavelength of the lasers. Detection systems require complementary illumination equipment because they do not operate with low illumination levels.

BRIEF DESCRIPTION

In accordance with one aspect of the invention, a method for detecting missing tooth in mining shovel is disclosed. The method includes receiving a pair of image frames from a camera disposed on a rope mine shovel configured to carry a mining load. The pair of image frames comprises a first image frame and a second image frame. The method further includes detecting a corresponding tooth line region for the pair of image frames to generate a pair of tooth line regions based on a shovel template set. The shovel template set comprises a plurality of bucket template images, a plurality of tooth line images, a plurality of locations corresponding to the plurality of bucket template images, and a plurality of locations of tooth line images. The pair of tooth line regions comprises a first tooth line region in the first image and a second tooth line region in the second image. The method also includes determining a difference image based on the pair of image frames and the pair of tooth line regions. The method further includes determining a response map representative of possible tooth positions based on the difference image using a tooth template matching technique. Further, the method includes selecting a tooth line among a plurality of candidate tooth lines based on the response map. The method also includes determining a tooth condition based on the tooth line and the difference image. Moreover, the method includes notifying the tooth condition to an operator of the rope mine shovel.

In accordance with another aspect of the invention, a system for detecting missing tooth in mining shovel is disclosed. The system includes an imaging device disposed on a rope mine shovel configured to carry a mining load, configured to acquire a plurality of image frames. The system also includes a processing device communicatively coupled to the imaging device and configured to receive a pair of image frames wherein the pair of image frames comprises a first image frame and a second image frame. The processing device is further configured to detect a corresponding tooth line region for the pair of image frames to generate a pair of tooth line regions based on a shovel template set. The shovel template set comprises a plurality of bucket template images, a plurality of tooth line images, a plurality of locations corresponding to the plurality of bucket template images, and a plurality of locations of tooth line images. The pair of tooth line regions comprises a first tooth line region in the first image and a second tooth line region in the second image. The processing device is further configured to determine a difference image based on the pair of image frames and the pair of tooth line regions and determine a response map representative of possible tooth positions based on the difference image using a tooth template matching technique. Further, the processing device is configured to select a tooth line among a plurality of candidate tooth lines based on the response map. The processing device is further configured to determine a tooth condition based on the tooth line and the difference image. The processing device is also configured to notify the tooth condition to an operator of the rope mine shovel.

In accordance with one aspect of the invention, a method for detecting missing tooth in mining shovel is disclosed. The method includes receiving a pair of image frames from a camera disposed on a rope mine shovel configured to carry a mining load. The pair of image frames comprises a first image frame and a second image frame. The method further includes detecting a corresponding metal part region for the pair of image frames to generate a pair of metal part regions based on a shovel template set. The shovel template set comprises a plurality of shovel template images, a plurality of metal part images, a plurality of locations corresponding to the plurality of shovel template images, and a plurality of locations of metal part images. The pair of metal part regions comprises a first metal part region in the first image and a second metal part region in the second image. The method further includes determining a difference image based on the pair of image frames and the pair of metal part regions. The method also includes determining a response map representative of possible metal part positions based on the difference image using a metal part template matching technique. Further, the method includes determining a metal part condition based on the response map and the difference image. The method also includes notifying the metal part condition to an operator of the rope mine shovel.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods for detecting an event, where the event may represent absence of at least a portion of a mining equipment. In certain embodiments, the event may represent absence of at least a portion of a tooth of the plurality of teeth of the mining equipment. In one example, the systems and methods are configured to detect a missing tooth in a mining shovel during operation.

The term 'motion range' refers to a range of distance a shovel bucket is enabled to move by a mining rope. The term 'template image' refers to a reference image of a shovel corresponding to a position along the motion range. The term 'shovel template set' refers to a set of tuples with each tuple having a plurality of template set elements. In one embodiment, each of the template set element includes, but is not limited to, a template image, a location of the shovel bucket, a location of the tooth line region, a bucket template image, and an image of the tooth line region in the template image. The term 'image tile' refers to a portion of an image frame. More specifically, the term image tile refers to a portion of the image frame having a size sufficient to include bucket image.

In certain embodiments, the systems and methods may be used for determining a metal part condition. The term 'metal part condition' is indicative of presence or absence of metal part of a rope mine shovel. In some embodiment, a method for determining the metal part condition includes receiving a pair of image frames from a camera disposed on a rope mine shovel configured to carry a mining load, wherein the pair of image frames comprises a first image frame and a second image frame. The technique further includes detecting a corresponding metal part region for the pair of image frames to generate a pair of metal part regions based on a shovel template set. The shovel template set includes a plurality of shovel template images, a plurality of metal part images, a plurality of locations corresponding to the plurality of shovel template images, and a plurality of locations of metal part images. The pair of metal part regions may include a first metal part region in the first image and a second metal part region in the second image. The technique further includes determining a difference image based on the pair of image frames and the pair of metal part regions. Further, a response map representative of possible metal part positions is generated based on the difference image using a metal part template matching technique. A metal part condition is determined based on the response map and the difference image. Further, the technique includes notifying a user of the metal part condition. The metal part condition is used to notify an operator of the rope mine shovel. The notification may be in the form of an audio signal, a visual signal or both emitted from an alarm device.

Figure 1:
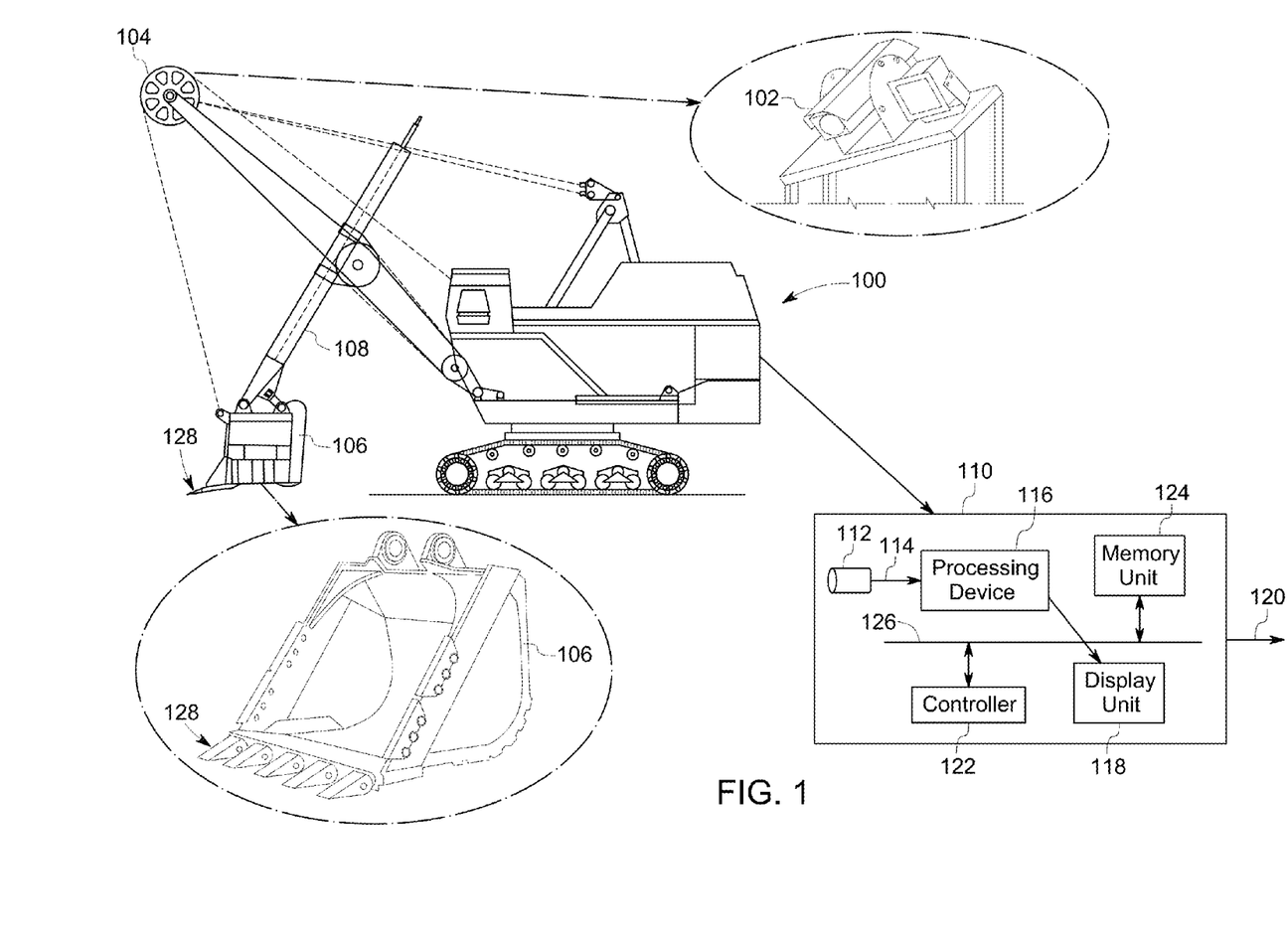
FIG. 1 is a diagrammatic illustration of a system for detecting missing tooth in accordance with an exemplary embodiment.

FIG. 1 is a diagrammatic illustration of a shovel guard system 110 employing a rope mine shovel 100, for detecting an event, where the event may represent absence of at least a portion of a mining equipment, such as a missing tooth, in accordance with an exemplary embodiment. The rope mine shovel 100 includes a vehicle 108, a boom 104 having a bracket 102, and a shovel bucket 106 having a tooth line 128 configured to carry mining load. The shovel guard system 110 is operatively coupled to the rope mine shovel 100 in a suitable fashion to facilitate detection of the event. For example, the shovel guard system 110 may be disposed on the vehicle 108 or the boom 104. It should be noted that the shovel guard system 110 may also be disposed in any other elevated position suitable for viewing the shovel bucket 106 when the mining operation is in progress.

The shovel guard system 110 includes an imaging device 112, a processing device 116, a display unit 118, a memory unit 124, and a controller 122. In one embodiment, various components of the shovel guard system 110 may be communicatively coupled to each other via a communication bus 126. Although not illustrated, in alternative embodiments, the various components of the shovel guard system 110 may be coupled to one another by other means such as a wired or a wireless communication link. The shovel guard system 110 is further configured to generate an alert signal 120 in response to detection of the event. By way of example, the alert signal may be sent to the operator when the shovel guard system 110 detects at least a portion of a tooth missing. In one embodiment, the alert signal 120 may be used by an operator of the rope mine shovel 100 to at least temporarily discontinue the operation of the rope mine shovel 100.

In the illustrated embodiment, the imaging device 112 is an industrial camera or a video camera mounted on the boom 104 and configured to monitor the shovel bucket 106 during operation of the rope mine shovel 100. In other embodiments, any other type of camera such as CCTV camera, suitable for viewing the shovel bucket during mining operation may also be used. By way of example, the imaging device 112 may be bracket fitted on the boom 104. The imaging device 112 is securely fixed to the bracket 102 and focused to clearly see the bucket and tooth line during the operation of the rope mine shovel. It may be noted that in alternative embodiments, the imaging device 112 may be mounted on other portions of the rope mine shovel 100 such that the imaging device has a clear view of the shovel bucket and teeth line during operation of the rope mine shovel 100. In one embodiment, the imaging device 112 may be configured to continuously or intermittently monitor the shovel bucket 106. In one embodiment, a high-intensity auxiliary light source is installed on the boom 104 and is configured to illuminate the shovel bucket 106 during poor lighting conditions. The imaging device is further configured to acquire a plurality of images capturing rigid motion of the shovel bucket 106 during a predetermined range. In particular, two or more images from the plurality of images may be aligned with respect to one another using a homographic transformation.

The imaging device 112 is also configured to collect a plurality of template images to generate a shovel template set. In one embodiment, generation of the shovel template set includes annotating each of the plurality of template images to indicate a bucket portion and a tooth line portion by an operator with the assistance of the processing device 116 or the controller 122. Further, annotation of each of the plurality of template images includes determining a location of the bucket portion, and a location of the tooth line portion.

An image annotation tool may be used to help the operator to annotate each of the plurality of template images to extract the bucket portion, the tooth line portion, and identify the locations of the bucket and tooth line portions. It should be noted that an image having a "bucket portion" of a template image is referred herein as a "bucket image" and an image having a "tooth line portion" of a template image is referred herein as a "tooth line image." Accordingly, the shovel template set includes a plurality of bucket images, a plurality of tooth line images, a plurality of bucket locations, a plurality of tooth line locations corresponding to the plurality of template images. It should be noted herein that the bucket image is an example of a region of interest extracted from the template image for easy identification of the tooth line portion. In alternative embodiments, any other region of interest (e.g., the rope wheel region) other than the bucket portion that may be identified in different template images may be used instead of the bucket image.

The shovel template set is denoted by symbol E representative of a set of N template images $\{E_i\}$ for i=1, 2, ..., N. Each of the plurality of template images $E_i$ is represented by a set $\{B_i, P_i, R_i, T_i, L_i\}$, where $B_i$ is a bucket image, $P_i$ is a rectangle representative of size and location of the bucket image, $T_i$ is a tooth line image, $R_i$ is a rectangle representative of size and location of the tooth line image, and $L_i$ is a tooth line information having M no. of tooth locations. In one embodiment, each element of the plurality of shovel template set is derived from a plurality of images acquired while the shovel bucket is moving along the motion range. In one embodiment, the plurality of images may be obtained by acquiring at equal intervals of time.

The processing device 116 is communicatively coupled to the imaging device 112 and configured to receive at least a pair of image frames among the plurality of image frames and detect corresponding tooth line regions for the pair of image frames to generate a pair of tooth line regions based on the shovel template set. The pair of image frames includes a first image frame acquired at a first time instant and a second image frame acquired at a second time instant subsequent to the first time instant. In one embodiment, the first image frame and the second image frames are adjacent image frames among the plurality of images. The pair of tooth line regions includes a first tooth line region in the first image and a second tooth line region in the second image.

In one embodiment, the processing device 116 is configured to identify a matching element among the plurality of template set elements with a real time image frame acquired from the camera. The processing device 116 is configured to generate a plurality of image tiles based on the real time image. In one embodiment, the plurality of image tiles is generated based on size of bucket image. Further, the processing device 116 is configured to determine a measure of difference between a bucket template image among a plurality of bucket template images and an image tile among the plurality of image tiles to generate a plurality of matching scores. Matching scores of the plurality of matching scores are ranked and when a Euclidean distance is used as the measure of difference, a minimum matching score is selected. The matching tile corresponding to the minimum matching score is identified as the detected bucket location of the real time image frame. Specifically, the match score is defined as represented by Equation 1.

$$\text{match\_score}(I(i,j)) = d(f(B_i), f(I(i,j))) \quad \text{(Equation 1)}$$

where, I(i,j) is an image tile generated from the real time image frame of the same size of the bucket image $B_i$ shifted around the annotated location $P_i$ and compared with the bucket template image $B_i$. The function $d(f(B_i), f(I(i,j)))$ represents Euclidean distance and the function $f(I(i,j))$ represents histogram of oriented gradients (HoG) feature extractor. An element set among the shovel template set is selected based on the tile corresponding to the minimum matching score. In other embodiments, a different measure of difference such as a cross correlation coefficient, a root mean square value or a sum of absolute difference may be used to determine the plurality of matching scores. A maximum value among the plurality of matching scores is used to detect the bucket location when the cross correlation coefficient is used. In embodiments where the RMS values (or the sum of absolute difference) is used, a minimum value among the plurality of matching scores is used to detect the bucket location.

In one embodiment, a tooth line region is determined based on the detected bucket location and the selected element set. In one embodiment, location of the image tile corresponding to the minimum matching score is denoted by a tile bounding box as represented by Equation 2 as:

$$P_t = \{x(t), y(t), w(t), h(t)\} \quad \text{(Equation 2)}$$

where, x(t), y(t) are the x-coordinate and y-coordinate points of the top-left corner of the bounding box of the selected tile image, w(t) is the width of the bounding box of the selected tile image, and h(t) is the height of the bounding box of the selected tile image.

Further, the location of the bucket image of the selected element set is denoted by a template bounding box represented by Equation 3.

$$P_b = \{x(b), y(b), w(b), h(b)\} \quad \text{(Equation 3)}$$

where, x(b), y(b) are the x-coordinate and y-coordinate points of the top-left corner of the template bounding box, w(b) is the width of the template bounding box of the selected tile image, and h(b) is the height of the template bounding box of the bucket image in the selected element set. Similarly, the location of the tooth line image of the selected element set is denoted by a tooth line bounding box given by $$P_l = \{x(l), y(l), w(l), h(l)\} \quad \text{(Equation 4)}$$

where, x(l), y(l) are the x-coordinate and y-coordinate points of the top-left corner of the template tooth line box, w(l) is the width of the template bounding box of the selected tooth line image, and h(l) is the height of the template bounding box of the tooth line image in the selected element set. The location of the tooth line region is given by $$P_L = \{x(L), y(L), w(L), h(L)\} \quad \text{(Equation 5)}$$

where, x(L), y(L) are the x-coordinate and y-coordinate points of the top-left corner of the detected tooth line box, w(L) is the width of the bounding box of the detected tooth line image, and h(L) is the height of the bounding box of the detected tooth line image. The x-coordinate of the bounding box of the detected tooth line is given by x(l)+x(b)−x(t), the y-coordinate of the bounding box of the detected tooth line is given by y(l)+y(b)−y(t), the width of the bounding box of the detected tooth line is given by w(l) and the height of the bounding box of the detected tooth line is given by h(l).

The processing device 116 is further configured to determine a difference image based on the pair of image frames. It may be noted that the first image frame is not aligned with the second image frame due to the bucket motion. Consequently, in some embodiments, a homography transformation is required to warp the first frame image to generate a transformed image. The transformed image is suitable for aligning with the second image. The homography transformation is determined by determining a transformation of the first tooth line image with respect to the second tooth line image. In one embodiment, the homography transformation is obtained based on an optical flow algorithm with outlier rejection. The transformed image is generated by multiplying the first image pixels by a matrix representative of the homography transformation. The matrix elements are determined by determining correspondence between features of the first image and the second image. In one embodiment, the processing device is further configured to determine a first gradient image corresponding to the first image frame and a second gradient image corresponding to the second image frame. In another embodiment, the first gradient image is determined based on the transformed image. The first gradient image and the second gradient image includes pixel values representative of gradient of intensity values of corresponding pixels of the first image and the second image having pixel values representative of intensity values. Further, the difference image is determined as a difference between the first gradient image and the second gradient image. In an alternate embodiment, the transformed image, the first gradient image and the second gradient image are obtained based on the first tooth line image and the second tooth line image. In one embodiment, in a first step, a gradient image may be obtained based on the first image frame. In a second step, a first gradient image may be obtained by applying homography transformation to the gradient image.

The processing device 116 is also configured to determine a response map representative of possible tooth positions based on the difference image using a tooth template matching technique. The template matching technique includes selecting a tooth template image $T_i$ corresponding to the template image used for determining the tooth line region. The template matching technique also includes sliding the tooth template image $T_i$ over the difference image by consecutively positioning the tooth template image at a plurality of locations on the difference image. Further, the template matching technique includes determining a correlation between the tooth template image $T_i$ and the difference image. In one example, the correlation is determined by computing a cross correlation coefficient based on pixels of the difference image and the pixels of the tooth template image in the overlapping region. The correlation value corresponds to a pixel in the response map at the position of overlapping.

The processing device 116 is further configured to select a tooth line template $L_i$ corresponding to the template image used for determining the tooth line region. A plurality of candidate tooth lines is determined based on the tooth line template. The plurality of candidate tooth lines corresponds to scaled and rotated versions of the tooth line template. A fit score value is calculated for each of the candidate tooth line based on the response map and the candidate tooth line. Accordingly, a plurality of fit score values is determined corresponding to the plurality of candidate tooth lines. In one embodiment, a sum of pixel values of the response map overlapping with the determined tooth line is determined as the fit score value. A matching tooth line among the plurality of candidate tooth lines is determined using the plurality of fit score values. In one embodiment, a maximum value among the plurality of fit score values is selected and the corresponding candidate tooth line is selected as the matching tooth line. It should be noted herein that the matching tooth line is the best candidate tooth line among the plurality of candidate tooth lines that substantially matches with the tooth line 128 of the shovel bucket 106.

The processing device 116 is further configured to determine presence of an event, where the event represents a missing tooth condition based on the matching tooth line and the difference image, using a missing score value. As stated previously, the difference image is determined as a difference between the first gradient image and the second gradient image corresponding to the first image and the second image respectively. In one embodiment, the missing score value is determined as a correlation coefficient generated by cross correlating pixel values in neighborhood of a tooth position in the selected tooth line based on the difference image. In one embodiment, a plurality of pixels in the difference image around a position of a tooth of a tooth line is determined. Further, a sum of the plurality of pixel values of the difference image is determined. The sum is compared with a missing measurement threshold value and a missing flag is set to a value of one if the sum exceeds the missing measurement threshold value. A plurality of missing score values is determined corresponding to the plurality of teeth in the selected tooth line. In one embodiment, each of the plurality of score values is compared with a missing tooth threshold. A missing tooth condition is identified when a missing score value is larger than the missing tooth threshold. In one embodiment, the missing score value or a missing tooth condition is used to notify an operator of the rope mine shovel. In one embodiment, the notification may include at least one of an alarm signal. Moreover, a decision may be made whether to continue the operation of the system or to stop the operation of the rope mine shovel. In other embodiments, the alarm signal may be provided to the operator and the operator in turn may discontinue the operation of the rope mine shovel.

In another embodiment, a missing count value is initiated to zero. A plurality of missing flags corresponding to a plurality of image frames is determined. Further, the plurality of missing flags is added to the missing count. Finally, a missing tooth condition is determined when the missing count is greater than a missing count threshold value.

The display unit 118 is communicatively coupled to the processing device and configured to display images of shovel, bucket or tooth line region provided by the processing device 116. The memory unit 124 may be communicatively coupled to the processing device 116 through the communication bus 126. Also, the memory unit 124 may be a non-transitory storage medium. For example, the memory unit 124 may be a dynamic random access memory (DRAM) device, a static random access memory (SRAM) device, flash memory or other memory devices. In one embodiment, the memory unit 124 may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, a non-transitory computer readable medium may be encoded with a program to instruct the processing device 116 to perform the functions of one or more of the imaging device 112, the processing device 116 and the display unit 118.

The controller 122 is communicatively coupled to the communications bus 126 and configured to access the memory unit 124. The controller 122 is further configured to provide instructions to the imaging device 112, the processing device 116 and the display unit 118 to perform intended actions in a coordinated way. In one embodiment, the processing device 116 may perform the functions of the controller 122.

Furthermore, the shovel guard system 110 includes one or more processors having one or more of an arithmetic logic unit, a microprocessor, a general purpose controller, and a processor array to perform the desired computations or run the computer programs. In one embodiment, the functionality of one or more processors may be related to tasks performed by one or more of the imaging device 112, the processing device 116, the controller 122 and the display unit 118. Also, in some embodiments, the one or more processors may be located in one location such as mining vehicle or be distributed in several locations across the mining site.

Figure 2:
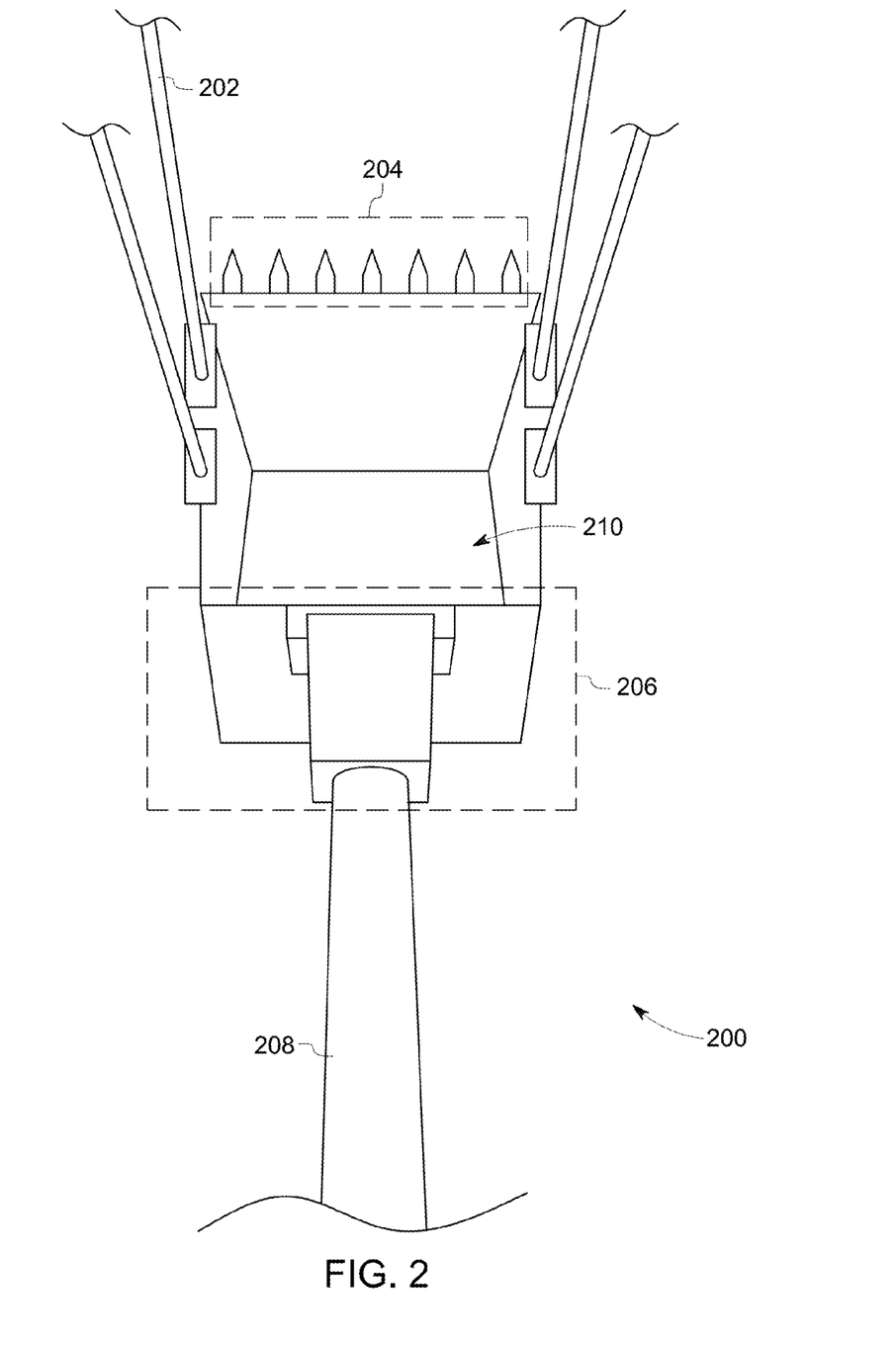
FIG. 2 is an image frame illustrating bucket location and tooth line location in accordance with an exemplary embodiment.

FIG. 2 is an image frame 200 illustrating bucket location and tooth line location in accordance with an exemplary embodiment. The image frame 200 illustrates a rope 202 and a stick 208 connected to mining shovel 210. A prominently visible portion below the bucket is selected in the image frame 200 as a region of interest represented by a rectangle 206. The region of interest represented by the rectangle 206 may be any region in the image frame that may be consistently identified during the operation of the mining shovel 210. In one embodiment, rope wheels are considered in the rectangle 206 as the region of interest. The term 'bucket' is generally used herein interchangeably to the region of interest. The image frame 200 also includes a tooth line region represented by a rectangle box 204. A template image is determined based on the image frame 200. In one embodiment, a bucket image, a tooth line image, location of the bucket image, location of the teeth in the tooth line image, and a tooth template image are annotated in the image frame to determine the template image.

Figure 3:
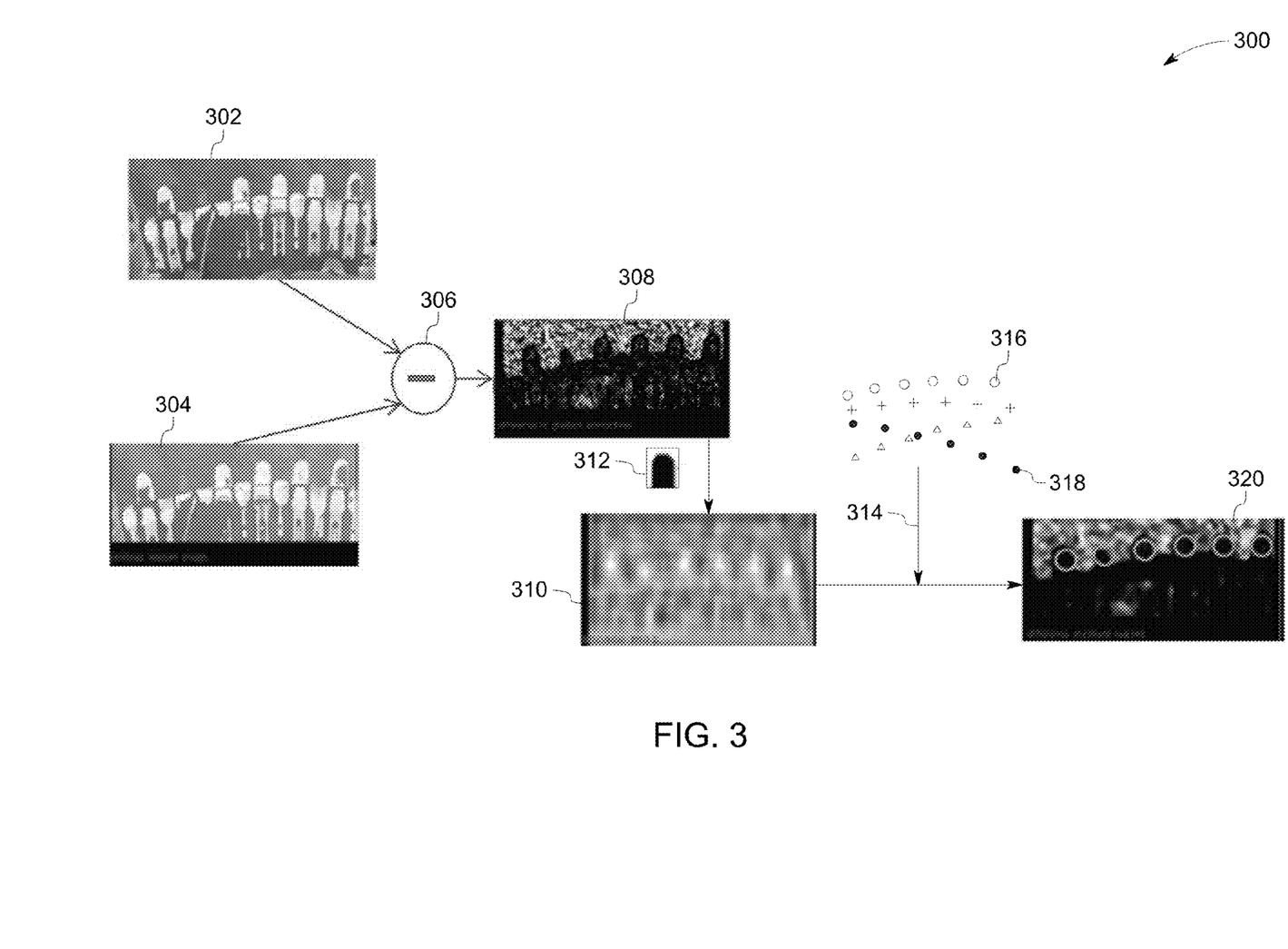
FIG. 3 is a graphical illustration of intermediate steps of processing in accordance with an exemplary embodiment.

FIG. 3 is a schematic 300 of intermediate steps of processing in accordance with an exemplary embodiment. The schematic 300 includes a first tooth line region 302 corresponding to the first image frame and a second tooth line region 304 corresponding to the second image frame. In one embodiment, the first tooth line region 302 is extracted from the transformed image. In another embodiment, the first tooth line region 302 and the second tooth line region 304 may represent image gradient values instead of intensity values. The schematic further illustrates a difference image 308 generated based on the first tooth line region 302 and the second tooth line region 304 using a differencing operation 306. In one embodiment, the differencing operation includes determining a cosine of an angle formed by a first gradient value corresponding to the first tooth line region 302 with a second gradient value corresponding to the second tooth line region 304. In other embodiments, the differencing operation may be performed in other ways. The schematic also shows a response map 310 generated based on the difference image 308 using a tooth template image 312. A plurality of candidate tooth lines 316, 318 is used to identify a matching tooth line 320 based on the response map 310. Each of the plurality of candidate tooth lines 316, 318 is scaled and rotated version of the tooth line associated with the template image used to determine the tooth line region. A correlation operation 314 is used to determine fit score value for each of the plurality of candidate tooth lines 316, 318.

Figure 4:
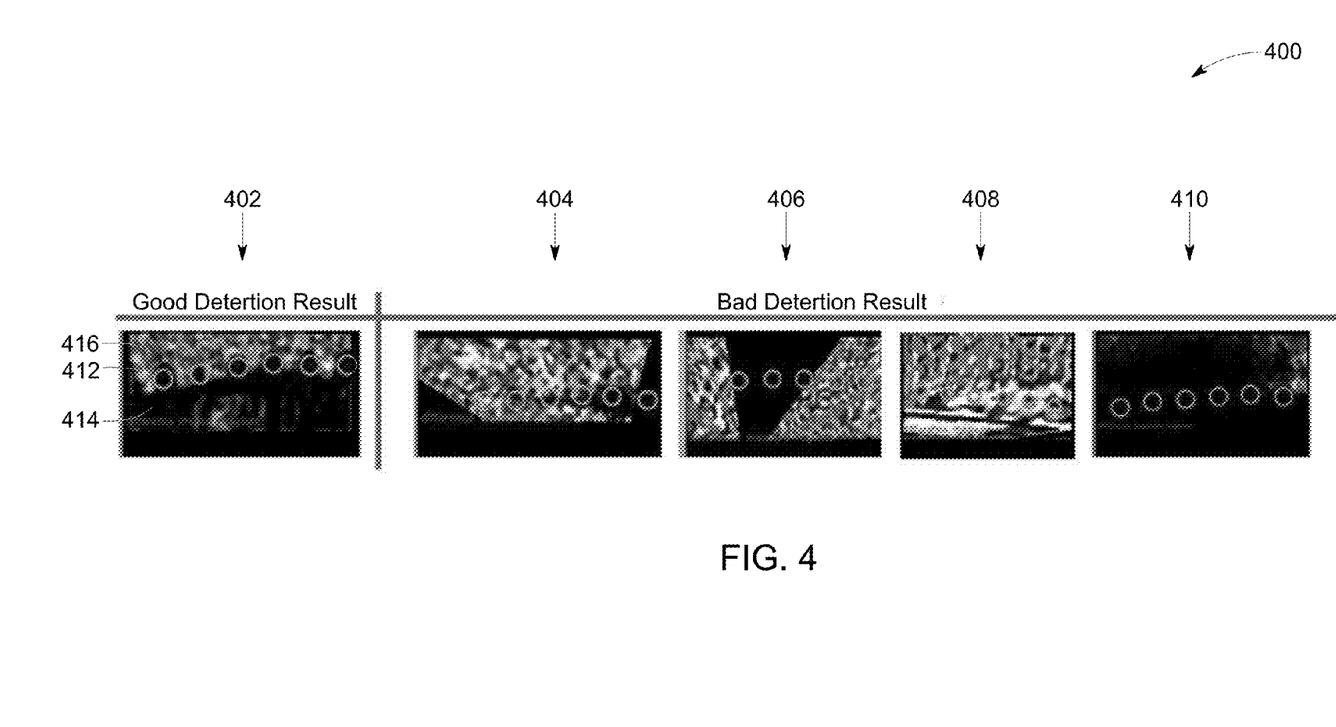
FIG. 4 is a graphical illustration of effectiveness of frame rejection technique in accordance with an exemplary embodiment.

FIG. 4 illustrates effectiveness of frame rejection scheme in accordance with an exemplary embodiment. FIG. 4 includes an image 402 exhibiting good detection result. The image 402 includes a tooth line 412, a relatively dark region 414 below the tooth line 412 and relatively whiter region 416 above the tooth line 412. FIG. 4 also includes a plurality of images 404, 406, 408, 410 exhibiting bad detection results. In the images 404, 408, white region is seen below the tooth line region. The image 406 exhibits white and dark regions on both side of the tooth line region and the image 410 exhibits dark region on either side of the tooth line region. A bad tooth line is detected when either a darker region is not present below the tooth line region or when a brighter region is not present above the tooth line region. An image frame that provides a bad tooth line detection is rejected during processing. Rejection of image frames resulting in bad tooth line detection reduces false positive rate.

Figure 5:
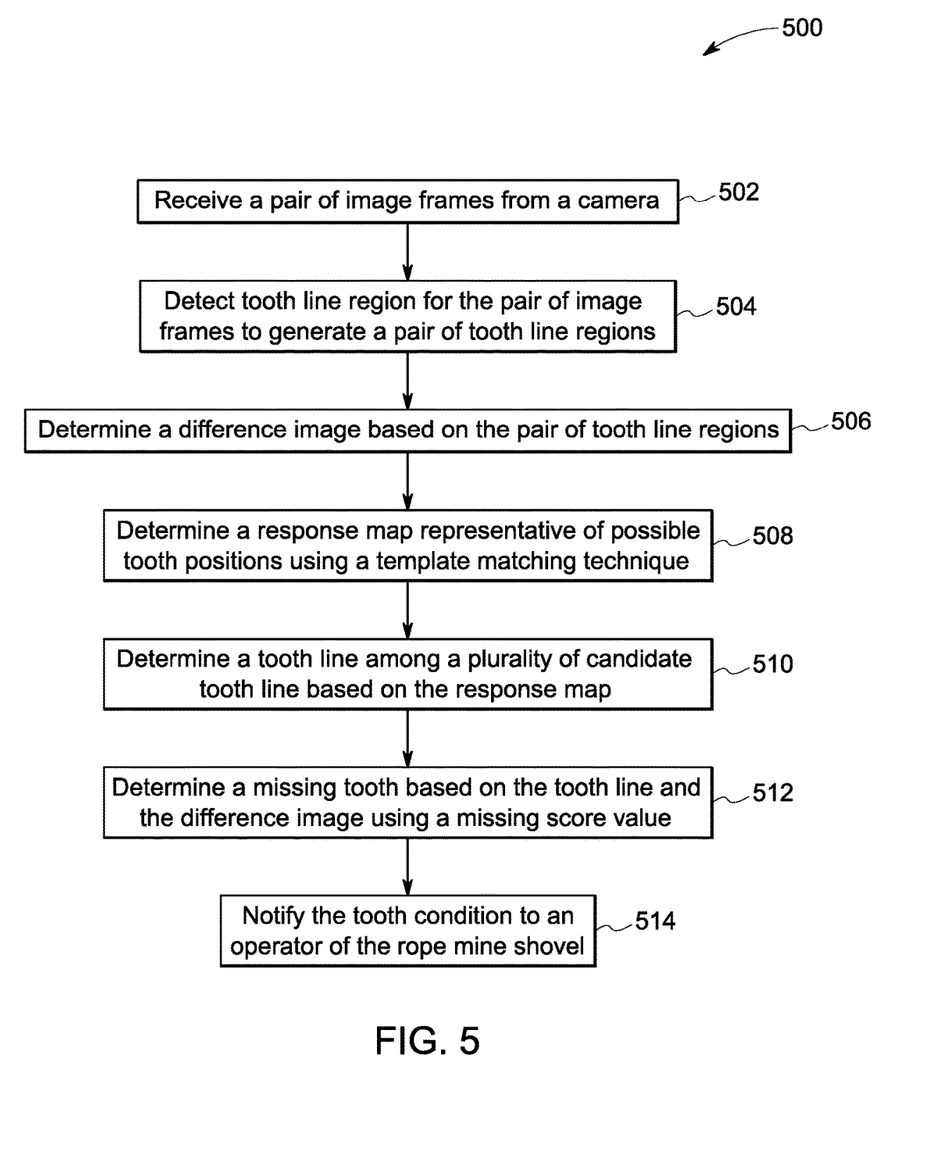
FIG. 5 is a flow chart of a method of detecting missing tooth in accordance with an exemplary embodiment.

FIG. 5 is a flow chart 500 of a method of detecting missing tooth in accordance with an exemplary embodiment. The method includes receiving a pair of image frames from a camera focusing on a rope mine shovel configured to carry a mining load as indicated in step 502. The pair of image frames includes a first image and a second image. The method further includes detecting a corresponding tooth line region for the images in the pair of image frames to generate a pair of tooth line regions based on a shovel template set in step 504. The shovel template set comprises a plurality of bucket template images, a plurality of tooth line images, a plurality of locations corresponding to the plurality of bucket template images, and a plurality of locations of tooth line images. The pair of tooth line regions includes a first tooth line region in the first image and a second tooth line region in the second image. In one embodiment, a plurality of image tiles are generated corresponding to an image frame among the pair of image frames. A correlation value is determined between a bucket template image among a plurality of bucket template images and an image tile among the plurality of image tiles to generate a plurality of matching scores. A bucket template image and an associated image tile corresponding to a minimum value among the plurality of matching scores is determined. A location of the tooth line region based on location of the selected image tile, location of the selected bucket template image, and a location of tooth line region associated with the selected bucket template image is determined.

The method further includes determining a difference image based on the pair of image frames in step 506. The method of determining the difference image includes detecting a first tooth line image from the first image frame and a second tooth line image from the second image frame. Further, in one embodiment, a homography transformation of the first tooth line image with respect to the second tooth line image is determined and a transformed image is determined by applying the homography transformation to the first image frame. Further, a first gradient image corresponding to the transformed image and a second gradient image corresponding to the second image frame are determined. Finally, the difference image is obtained as the difference between the first gradient image and the second gradient image. In step 508, the method includes determining a response map representative of possible tooth positions based on the difference image using a tooth template matching technique. The tooth template matching technique includes consecutively positioning a tooth template image at a plurality of locations on the difference image and determining a plurality of correlation coefficients corresponding to the plurality of locations of the difference image based on the difference image and the tooth template image. In another embodiment, a plurality of candidate tooth lines based on a template tooth line is generated associated with the selected bucket template image. As noted previously, each of the plurality of candidate tooth lines is a scaled, and rotated version of the template tooth line.

In step 510, the method includes determining a tooth line among a plurality of candidate tooth lines based on the response map using a fit score value. In one embodiment, the fit score value is determined as a sum of response map values overlapping with the determined tooth line. The method also includes determining presence of an anomaly in the tooth line of the shovel. In step 512, a missing tooth flag is set based on the tooth line and the difference image using a missing score value when an anomaly is detected in the tooth line. In one embodiment, a plurality of pixels in the difference image around a position of a tooth line is determined. Further, a sum of the plurality of pixels of the difference image is determined and the sum is compared with a missing measurement threshold value. A missing flag is set to a value of one if the sum exceeds the missing measurement threshold value.

Further, a missing tooth is determined based on a missing tooth count. In one embodiment, a missing tooth count value is initiated to zero. A plurality of missing flags corresponding to a plurality of image frames is determined. Further, the plurality of missing flags are added to the missing tooth count. A missing tooth condition is determined when the missing tooth count is greater than a missing tooth count threshold value.

In one embodiment, a frame rejection technique is employed to reduce errors in detecting a missing tooth condition. Some image frames contribute to errors and they need to be excluded from processing to reduce the errors. The method of image frame rejection includes identifying a tooth line in the difference image using the image frame. Further, a bad detection condition is determined based on the difference image and the matched tooth line. In one embodiment, a brighter region in the difference image above the matched tooth line is verified. In the same embodiment, a darker region is verified below the matched tooth line. If one of the conditions is not verified, a bad detection condition is identified. The image frame and corresponding identified tooth line are rejected when a bad detection condition is identified.

In one embodiment, the missing score value is further used to determine a missing tooth condition. In step 514, the method also includes notifying the tooth condition to an operator of the rope mine shovel. In one embodiment, notifying includes at least one of emitting an alarm signal and stopping the rope mine shovel. In other embodiments, at least one of the missing score value, the missing tooth condition, the missing count value may be suitably used to display relevant images on the display unit or to alert an operator to avoid feeding metallic parts into the crusher.

Although embodiments of the present specification disclose detecting a missing tooth condition, the methods are applicable for detecting any other metallic part of the mining shovel.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method, comprising:
   receiving a pair of image frames from a camera disposed on a rope mine shovel configured to carry a mining load, wherein the pair of image frames comprises a first image frame and a second image frame;
   detecting a corresponding tooth line region for the pair of image frames to generate a pair of tooth line regions based on a shovel template set, wherein the shovel template set comprises a plurality of bucket template images, a plurality of tooth line images, a plurality of locations corresponding to the plurality of bucket template images, and a plurality of locations of tooth line images, and wherein the pair of tooth line regions comprises a first tooth line region in the first image and a second tooth line region in the second image;
   determining a difference image based on the pair of tooth line regions;
   determining a response map representative of possible tooth positions based on the difference image using a tooth template matching technique;
   selecting a tooth line among a plurality of candidate tooth lines based on the response map;
   determining a tooth condition based on the tooth line and the difference image and
   notifying the tooth condition to an operator of the rope mine shovel.

2. The method of claim 1, wherein notifying the tooth condition comprises emitting an alarm.

3. The method of claim 1, wherein detecting the tooth line region comprises:
   generating a plurality of image tiles corresponding to an image frame among the pair of image frames;
   determining a correlation between a bucket template image among a plurality of bucket template images and an image tile among the plurality of image tiles to generate a plurality of matching scores;
   selecting a bucket template image and an associated image tile corresponding to a minimum value among the plurality of matching scores; and
   determining a location of the tooth line region based on location of the selected image tile, location of the selected bucket template image, and a location of tooth line region associated with the selected bucket template image.

4. The method of claim 1, wherein determining the difference image comprises:
   determining a homography transformation of the first tooth line image with respect to the second tooth line image; and
   generating a transformed image by applying the homography transformation to the first image.

5. The method of claim 3, wherein determining the difference image comprises:
- determining a first gradient image corresponding to the transformed image and a second gradient image corresponding to the second image frame; and
- performing a differencing operation between the first gradient image and the second gradient image.

6. The method of claim 1, wherein the tooth template matching technique comprises:
- consecutively positioning a tooth template image at a plurality of locations in the difference image; and
- determining a plurality of correlation coefficients corresponding to the plurality of locations in the difference image based on the tooth template image and a plurality of pixels of the difference image.

7. The method of claim 1, wherein determining the tooth line comprises generating a plurality of candidate tooth lines based on a template tooth line associated with the selected bucket template image, wherein each of the plurality of candidate tooth lines are scaled and rotated version of the template tooth line.

8. The method of claim 7, wherein determining the tooth line comprises determining a fit score value as a sum of pixel values of the response map overlapping with the determined tooth line.

9. The method of claim 1, wherein determining the tooth condition comprises:
- determining a plurality of pixels in the difference image around a position of a tooth of a tooth line;
- determining a missing score value as a sum of the plurality of pixels of the difference image; and
- comparing the missing score value with a missing measurement threshold value and setting a missing flag to a value of one if the sum exceeds the missing measurement threshold value.

10. The method of claim 9, wherein determining the tooth condition comprises:
- initiating a missing count value to zero;
- determining a plurality of missing flags corresponding to a plurality of image frames;
- adding the plurality of missing flags to the missing count; and
- determining a tooth condition when the missing count is greater than a missing count threshold value.

11. The method of claim 1, wherein receiving the pair of image frames comprises rejecting an image frame based on the difference image.

12. A system, comprising:
- an imaging device fitted on a rope mine shovel disposed on a rope mine shovel configured to carry a mining load, configured to acquire a plurality of image frames;
- a processor communicatively coupled to the imaging device and configured to:
  - receive a pair of image frames wherein the pair of image frames comprises a first image frame and a second image frame;
  - detect a corresponding tooth line region for the pair of image frames to generate a pair of tooth line regions based on a shovel template set, wherein the shovel template set comprises a plurality of bucket template images, a plurality of tooth line images, a plurality of locations corresponding to the plurality of bucket template images, and a plurality of locations of tooth line images, and wherein the pair of tooth line regions comprises a first tooth line region in the first image and a second tooth line region in the second image;
  - determine a difference image based on the pair of tooth line regions;
  - determine a response map representative of possible tooth positions based on the difference image using a tooth template matching technique;
  - select a tooth line among a plurality of candidate tooth lines based on the response map;
  - determine a tooth condition based on the tooth line and the difference image; and
  - notify the tooth condition to an operator of the rope mine shovel.

13. The system of claim 12, wherein the processor device is further configured to emit an alarm, or stop the rope mine shovel, or both.

14. The system of claim 12, wherein the processor device is further configured to:
- generate a plurality of image tiles corresponding to an image frame among the pair of image frames;
- determine a correlation between a bucket template image among a plurality of bucket template images and an image tile among the plurality of image tiles to generate a plurality of matching scores;
- select a bucket template image and an associated image tile corresponding to a minimum value among the plurality of matching scores; and
- determine a location of the tooth line region based on location of the selected image tile, location of the selected bucket template image, and a location of tooth line region associated with the selected bucket template image.

15. The system of claim 12, wherein the processor device is further configured to:
- determine a homography transformation of the first tooth line image with respect to the second tooth line image; and
- generate a transformed image by applying the homography transformation to the first image.

16. The system of claim 15, wherein the processor is further configured to:
- determine a first gradient image corresponding to the transformed image and a second gradient image corresponding to the second image frame; and
- determine a difference between the first gradient image and the second gradient image.

17. The system of claim 12, wherein the processor is further configured to:
- consecutively position a tooth template image at a plurality of locations on the difference image; and
- determine a plurality of correlation coefficients corresponding to the plurality of locations in the difference image based on the tooth template image and a plurality of pixels of the difference image.

18. The system of claim 12, wherein the processor is further configured to generate a plurality of candidate tooth lines based on a template tooth line associated with the selected bucket template image, wherein each of the plurality of candidate tooth lines are scaled and rotated version of the template tooth line.

19. The system of claim 18, wherein the processor is further configured to determine a fit score value as a sum of pixel values of the response map overlapping with a candidate tooth line among the plurality of tooth lines.

20. The system of claim 12, wherein the processor is further configured to:
- determine a plurality of pixels in the difference image around a position of a tooth of a tooth line;

determine a missing score value as a sum of the plurality of pixels of the difference image; and compare the missing score value with a missing measurement threshold value and setting a missing flag to a value of one if the sum exceeds the missing measurement threshold value.

21. The system of claim 12, wherein the processor is further configured to:

initiate a missing count value to zero;

determine a plurality of missing flags corresponding to a plurality of image frames;

add the plurality of missing flags to the missing count; and determine a tooth condition when the missing count is greater than a missing count threshold value.

22. The system of claim 12, wherein the processor is configured to reject an image frame based on the difference image.

23. A method, comprising:

receiving a pair of image frames from a camera disposed on a rope mine shovel configured to carry a mining load, wherein the pair of image frames comprises a first image frame and a second image frame;

detecting a corresponding metal part region for the pair of image frames to generate a pair of metal part regions based on a shovel template set, wherein the shovel template set comprises a plurality of shovel template images, a plurality of metal part images, a plurality of locations corresponding to the plurality of shovel template images, and a plurality of locations of metal part images, and wherein the pair of metal part regions comprises a first metal part region in the first image and a second metal part region in the second image;

determining a difference image based on the pair of metal part regions;

determining a response map representative of possible metal part positions based on the difference image using a metal part template matching technique;

determining a metal part condition based on the response map and the difference image and notifying the metal part condition to an operator of the rope mine shovel.

* * * * *